June 1, 1926.

W. E. WINE

TRACTOR SHOE

Filed April 18, 1925

Inventor:

William E. Wine,
by Parker Cook
Atty.

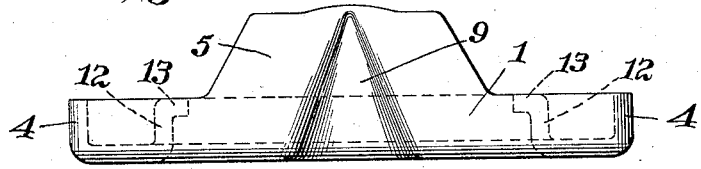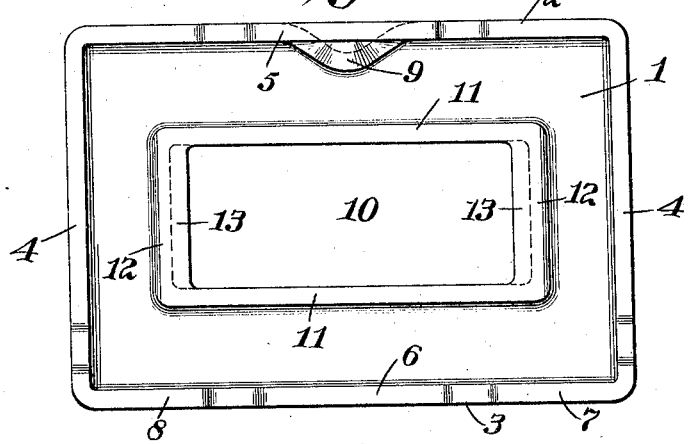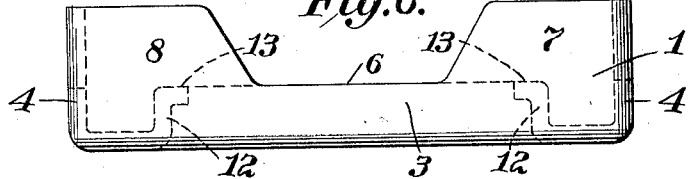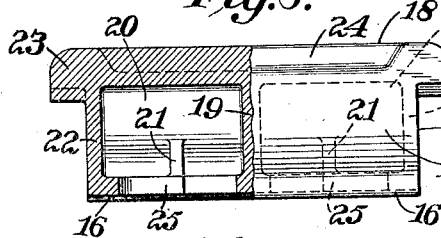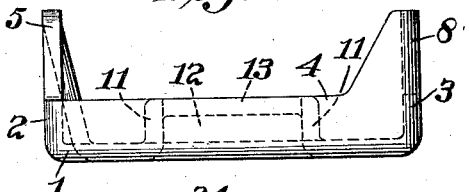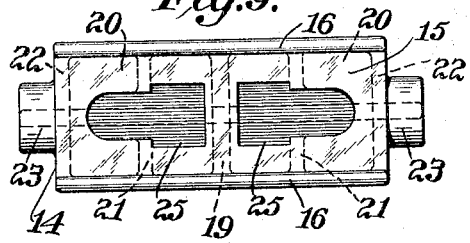

Patented June 1, 1926.

1,586,929

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR SHOE.

Application filed April 18, 1925. Serial No. 24,049.

My invention relates to new and useful improvements in tractor shoes and has for an object to provide shoes which may be quickly and readily applied to any form of metal rim of a tractor wheel.

Still another object of the invention is to so form these shoes that they may be quickly and readily fastened to the rim of the wheel, regardless of the size of the rim, and applicable to any rim, even if the same is provided with an upturned flange at its side or sides.

With a number of the forms of tractor shoes now in use on the rim of tractor wheels, it is necessary to have locking arrangements for the shoes or tread members that clamp over the edge of the rim of the wheel, and if the rim is a wide one a special size shoe and clamp are necessary as the ordinary clamp will not be long enough to reach to the edge of the rim, and again, if the rim happens to be provided with a flange at its side or sides, it will interfere with its clamping arrangements and the shoes can not be used until modifications are made in the shoe or clamp.

Still another object of the present invention is to provide a tractor shoe, consisting of the shoe proper or tread member and a novel form of locking or retaining means that may be placed through the tread member and secure the tread member to the rim of the wheel, two holes having been previously drilled in said rim.

Still another object of the present invention is to so form the shoe proper or tread member, that no metal will be lost in the operation, as the shoes proper or tread members are to be cut out and pressed from a blank; a tooth on one blank being cut out of the preceding blank and the cutout portion in the preceding blank forming two teeth on its blank so that each blank and later the shoe will be provided with three teeth which are arranged in staggered relation.

Still another object of the invention is to provide a tractor shoe that will be relatively light in weight, easily and quickly attached to the rim of any tractor wheel and quickly and readily removed if it becomes damaged in service.

Still another object of the present invention is to provide a tractor shoe wherein the shoe proper or tread member is cut from a blank and will be pressed into form while the fastening or retaining means is preferably cast.

Still another object of the invention is to provide a tractor shoe consisting of but two parts, the shoe proper or tread member and the retaining means, the former to be stamped out of sheet metal having teeth formed thereon, the tooth of one shoe being cut out of the preceding blank and the cut out portion forming two teeth on the preceding shoe, the one tooth on each shoe being bulged to greatly strengthen the same.

With these and numerous other objects in view, my invention relates to certain new and novel arrangements and combination of parts as will be hereinafter more fully described and pointed out in the claims.

Referring to the drawings showing a preferred form of the invention,

Fig. 4 is an outer plan view of the shoe proper or tread member, in that instance the retaining means being removed.

Fig. 5 is a front end view of the shoe proper or tread member showing the central tooth.

Fig. 6 is a rear view of the same.

Fig. 7 is a side elevation of the shoe proper or tread member.

Fig. 8 is a side elevation of the retaining means, part of the same being shown in section for the sake of clearness.

Fig. 9 is an inner plan view of the retaining member, and

Fig. 10 is an end elevation of the retaining member.

Figure 1:
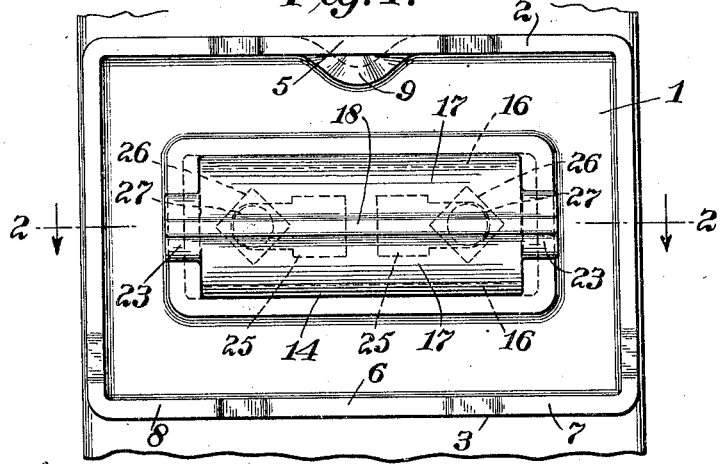
Fig. 1 is an outer plan view of the complete tractor shoe, the retaining means being shown in its locked position within the shoe proper or tread member.

Referring first to the shoe proper, or tread member 1, and its manner of construction, it will be seen from the several figures that the same is preferably rectangular in shape and is provided with the front flange 2, rear flange 3, and the side flanges 4.

This shoe or tread member 1 is preferably cut from a blank strip of metal, the front tooth 5 (Figs. 4 and 5) being cut from a preceding blank so that a cut out portion 6 thus appears at the rear of each blank and a tooth portion 5 at the front of each blank.

The blanks are then put in a heavy press capable of exerting at least 80 to 100 tons pressure to the square inch to form the upturned flanges as mentioned as well as the upturned tooth 5, the portions 7 and 8 of the flanges 3, in reality forming two teeth.

The metal in the tooth 5 is bulged as at 9 to greatly strengthen the same.

Figure 2:
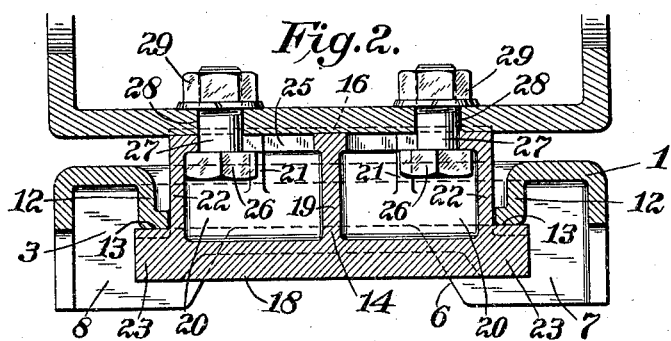
Fig. 2 is a central sectional view taken on line 2—2 of Fig. 1 showing a portion of the tractor wheel rim.

A central rectangular portion 10 is removed when the blanks are cut, the encircling walls 11 of this cut out portion being also flanged inwardly and the side walls 12 then pressed inwardly towards each other to form the bearing surface 13 as clearly shown in Figs. 2 and 4.

It will be seen that this is an economical way to form a shoe proper or tread member, as no metal is wasted from the blanks, with the exception of the cut out rectangular portion of the center of the shoe, and furthermore three teeth are provided which are in staggered relation, which is to be desired.

Of course these shoes proper or tread members may be formed in different shapes or different sizes, but the rectangular configurations shown in the drawings are the preferred form; also the metal may be of different thickness and the flanges of varying heights depending o nthe size of the tractor to which it is to be applied but it is to be understood that different sizes are unnecessary for every different size tractor, as the shoes may be applied to any rim regardless of the width, and large or small shoes will only be necessary where the weight of the tractors greatly vary.

Referring now to the novel means of holding the shoes in their position on the rim, it will be seen by referring to the several figures that I employ a retaining member 14 which is preferably of cast steel which, from a outer plan view is substantially wedge-shaped in appearance, it consisting of a rear flat wall 15 with the longitudinal ribs 16 and the two side walls 17 which merge at the apex 18 and at their rear with the flat wall 15. This retaining member as will also be seen from the several figures is hollow and is provided with a central transverse rib 19 which forms the two pockets 20. The rear wall and side walls may also be internally reinforced with the ribs 21 and the end walls 22 also tend to greatly strengthen this hollow cast retaining member.

On the opposite ends of this member 14 are shown the trunnions 23 which are formed integral with the side walls of the retaining member and with the rib 24 which extends out beyond the juncture of the two side walls 17 of the retaining member.

Thus far, it will be seen that I have provided a retaining member which is formed of cast metal which has the arcuate side walls, the outer rib, the two rear ribs and the two pockets formed from a central vertical rib which greatly strengthens the entire retaining member. Further, the rear wall 15 is provided with two key slots 25 one for each pocket, a portion of the slot being substantially square through which are passed the heads 26 of bolts 27, which after being passed therethrough are moved longtiudinally of the retaining member so that the heads may no longer be removed from the slots unless forced towards each other.

The application of the tractor shoe to the rim of the wheel is exceedingly simple. Holes 28 are drilled through the rim of the wheel at the desired intervals and the heads 26 of the bolts 27 are passed through the slots 25 in the retaining member 14. The shoe proper or tread member 1 is then laid on the rim of the wheel and the retaining member 14 passes centrally through the opening 10 so that the trunnions 23 will bear on the flange portion 13 of the shoe 1, and after these two parts are placed in position the ends of the bolts 27 will be passed through the rim of the wheel and lock washers and nuts 29 threaded on the bolts, thereby holding the retaining member tightly in place which in turn holds the shoe proper or tread members 1 in position.

Figure 3:
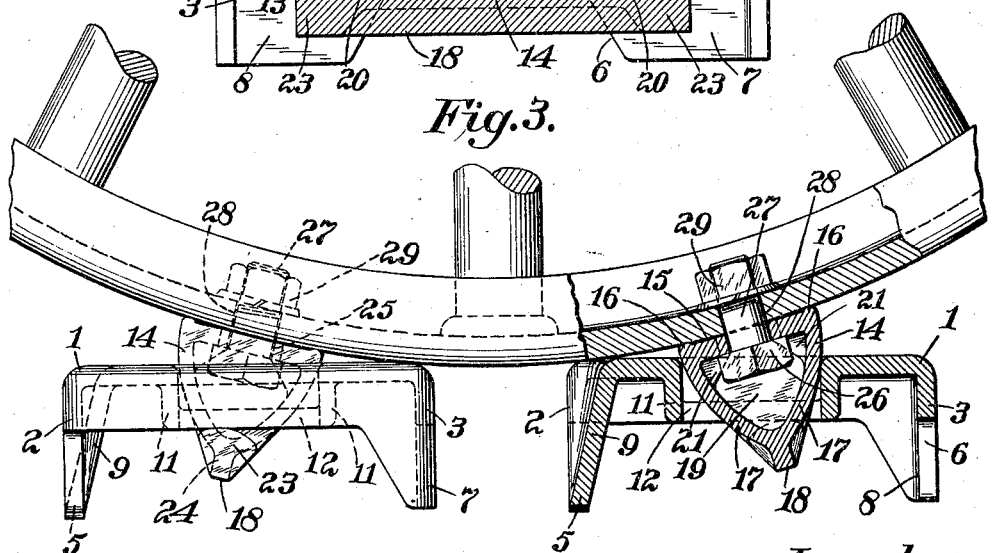
Fig. 3 is a side elevation showing two shoes attached to the rim of the tractor wheel, one of said shoes and a part of the rim being shown in section.

The shoes or tread members proper are therefore secured to the wheel but free to have a swinging movement so that when in contact with the ground they will assume the position as shown in Fig. 3.

The usual advantages of swinging shoes of this type are well known and need not be enlarged upon, and also the many advantages of this special type of shoe will be readily appreciated.

The three teeth on each shoe proper or tread member are in staggered relation and of course all of the shoes when secured to the wheel will form a staggered gripping means for the wheel.

It will also be readily seen how quickly any shoe may be removed if the same becomes damaged in use and it is also apparent that regardless of the width of the wheel rim or regardless of whether the rim is provided with internal or outwardly turned flanges, the shoes may be readily applied with no changes in the rim with the exception of drilling the holes about the periphery of the rim.

Not only do the shoes proper or tread members dig into the ground, but likewise the wedge-shaped retaining member will bite into the earth, adding to the traction of the shoe proper or tread member.

Each shoe is capable of a slight swinging movement which tends to free it of any earth which might tend to pack in the shoe so that the shoe will at all times be in a relatively clean condition.

The shoe proper or tread member presents on difficulties from a manufacturer's standpoint and is very economical to make, while the retaining means may be cast and may be quickly slipped through the shoe, the trunnions retaining the shoe in its operable position.

This application is a companion of other applications filed by me on April 8, 1925, Serial Number 21,609 and April 15, 1925, Serial Number 23,335, 38,678 filed June 22, 1925, and 50,511, filed August 15, 1925.

From the foregoing it will be seen that the shoe as a whole is a very efficient and economical one, the tread members being formed of sheets or bar metal and the ends so cut that the forming of one blank for the tread member also forms the succeeding end of the next blank, so that no metal is wasted with the exception of the metal cut from the center of the blank, and this may be utilized in the making of washers.

In several other companion applications which I have on file in the United States Patent Office, the tread and retaining members are rigidly fastened to each other and both rock with relation to the rim of the wheel, but in the present application it will be seen that the retaining member is rigidly secured to the rim and the tread member rocks with relation to the retaining member.

Having thus described my invention, what I claim as new and desire to secure by Letters Patent is:

1. A tractor shoe comprising in part a retaining means wedge-shaped in outline and provided with trunnions at its apex, and the base of said wedge-shaped retaining means provided with key slots.

2. A tractor shoe comprising in part a hollow retaining means wedge-shaped in outline, having a ridge along its apex and trunnions at the ends of said ridge, the hollow of the retaining means provided with slots for the reception of fastening means and a rim on the opposite sides of the face of the fastening means adapted to contact with the rim of a wheel.

3. A tractor shoe comprising a tread member having anticlinal walls and a base integral trunnions formed at its opposite ends at the apex, the said retaining means being divided into two chambers, the base of each of said chambers being provided with an opening for the reception of fastening means.

4. A tractor shoe comprising in part a tread member having anticlinal walls and a base plate formed integral with the walls, the said retaining means also having closed ends, the said retaining means being divided into two chambers and having an opening in the base of each chamber, trunnions formed at the opposite sides of the said retaining means and located at the apex thereof.

5. A tractor shoe comprising a hollow retaining means having anticlinal side walls, integral end walls and an integral base, an outwardly extending flange formed along the apex of the anticlinal walls and trunnions merging with the flange, side and end walls of said retaining means.

6. A tractor shoe comprising a retaining means having anticlinal side walls, a ledge formed along the apex thereof and extending beyond the opposite ends of said side wall, integral end plates, and an integral base plate provided with an opening therein, and trunnions formed at the opposite ends of the said retaining means at the apex thereof.

In testimony whereof I affix my signature.

WILLIAM E. WINE.